Dec. 4, 1928.
Sept. 17, 1929.

T. E. TAYLOR

OVEN CONSTRUCTION

Filed Nov. 26, 1926

Re. 17,438

2 Sheets-Sheet 1

Inventor
Thomas E. Taylor
By Hull Brock & West
Attorney

Reissued Sept. 17, 1929

RE 17,438

T. E. TAYLOR

OVEN CONSTRUCTION

Filed Nov. 26. 1926

2 Sheets-Sheet 2

Inventor

Thomas E. Taylor

By Hull Brock Elliot

Attorney

Reissued Sept. 17, 1929 Re. 17,438

UNITED STATES PATENT OFFICE.

THOMAS E. TAYLOR, OF MANSFIELD, OHIO, ASSIGNOR TO THE TAPPAN STOVE COMPANY, OF MANSFIELD, OHIO, A CORPORATION OF OHIO

OVEN CONSTRUCTION

Original No. 1,693,625, dated December 4, 1928, Serial No. 150,828, filed November 26, 1926. Application for reissue filed June 12, 1929. Serial No. 370,390.

This invention relates to stoves of the gas range type and one of the main objects of the invention is to provide a stove of the character described which is thoroughly effective and operable with the ordinary sources of heat and which is well suited for the economical consumption of gaseous fuel, either natural or artificial.

Another object of the invention is to provide a gas range having a baking and a broiling compartment in which the heat is positive and uniform throughout the entire area to be heated.

Another object of the invention is to provide a burner which is not materially effected by a poor adjustment or uneven flow of gas and which furnishes an even toasting area over the entire surface of the broiling compartment and which, due to its peculiar shape and construction will be free from warping.

Another object of the invention is to provide a novel supporting means for the burner in which the burner is well insulated from the enamel front strip of the stove and from the oven bottom.

A further object of the invention is to provide a novel stove front construction in which the enamel front strip will be protected from the direct heat of the burner and in which an air space is provided between the front cross piece and the enamel front piece.

A further object of the invention is the provision of a heat insulating strip consisting of an asbestos pad enclosed in a sheet metal covering and extending substantially across the front of the stove and positioned between the burner and the enamel front strip in such a manner as to prevent cracking or "crazing" of the enameled front strip.

A further object of the invention is to provide an oven bottom which is easy to remove, which is provided with a depression adapted to receive the fluid which may escape during the process of cooking and which is also provided with corrugations adapted to prevent warping or buckling of the same.

A further object of the invention is to provide a cast iron baffle plate which is supported above the burner between the burner and the enameled oven bottom or tray and in which the cast iron baffle is so shaped and placed as to direct heat evenly through all parts of the oven.

Figure 1:
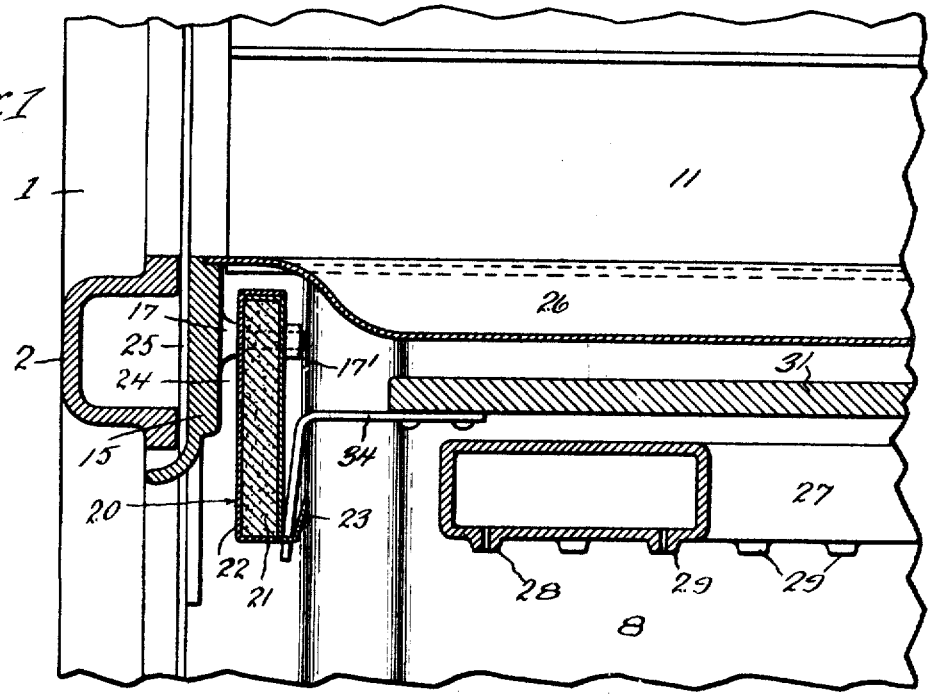
Figure 2:
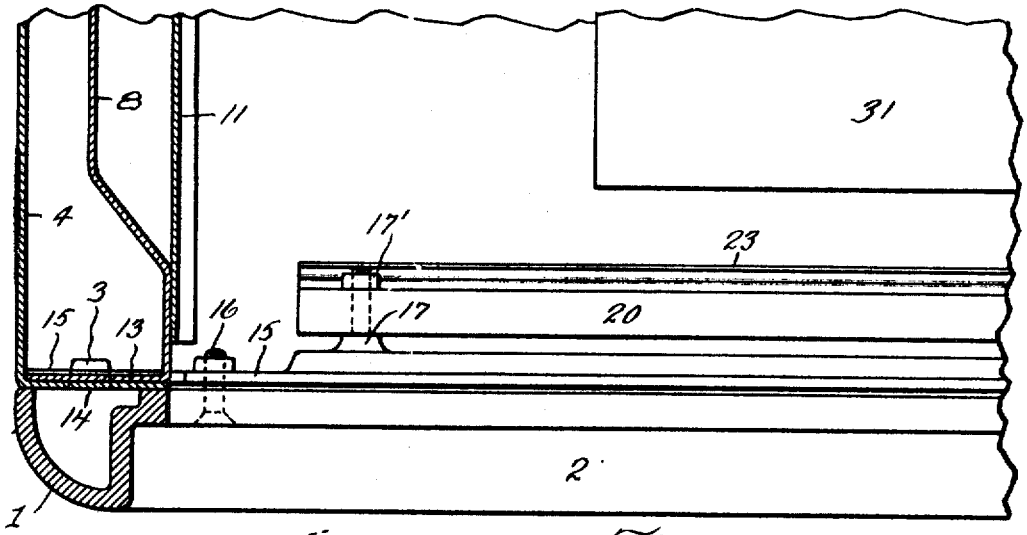
Figure 5:
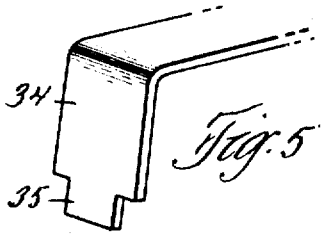
Figure 3:
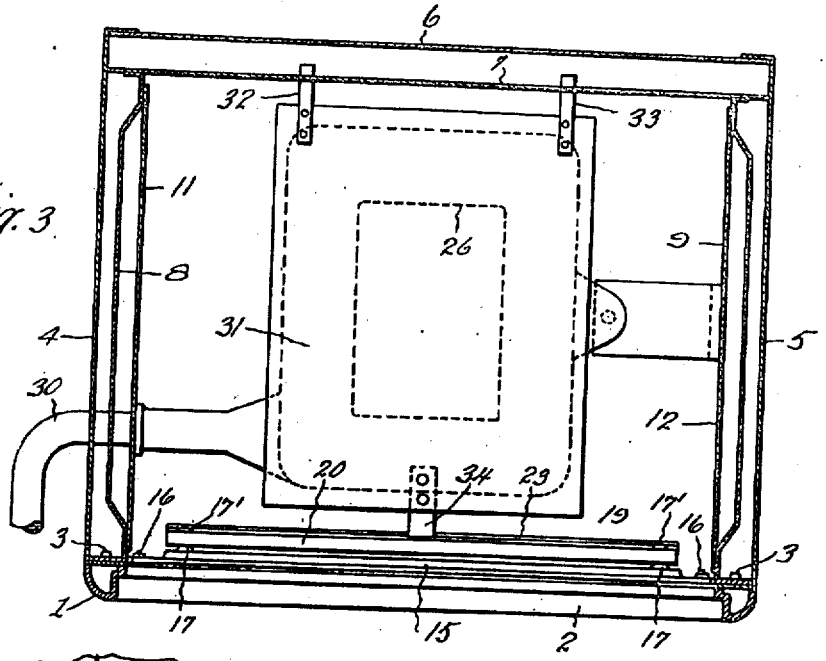
Figure 4:
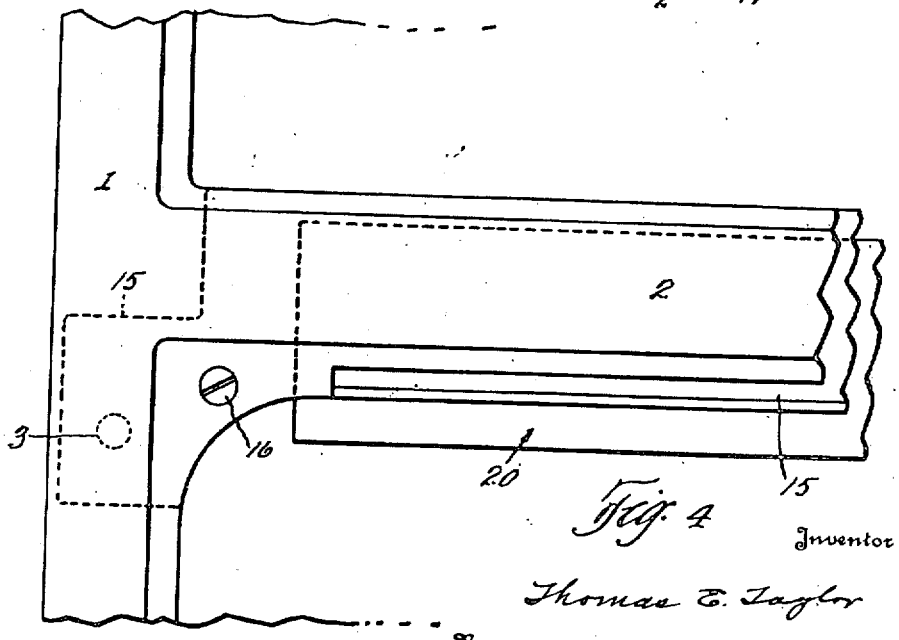

Further and more limited objects of the invention will appear as the description proceeds and by reference to the accompanying drawing in which Fig. 1 is an enlarged fragmentary view partly in vertical section and partly in front elevation of my improved stove front construction; Fig. 2 is a similar view partly in horizontal section and partly in elevation showing the front corner construction; Fig. 3 is a horizontal sectional view of the heating compartment with the oven bottom removed; Fig. 4 is an enlarged fragmentary detailed view in front elevation of the front construction with the stove doors removed and Fig. 5 is a detail perspective view of the front supporting arm and the cast iron baffle plate.

Referring now to the drawing, the numeral 1 designates the enamel frame having a cross piece 2 provided at each end with projections or lugs 3. The sides of the range are designated by the reference characters 4 and 5 and the back of the range is designated by the reference character 6. The range is provided with the usual lining consisting of a back 7, and sides 8 and 9. The sides of the lining 8 and 9 are shaped as most clearly shown in Fig. 3 to provide an air space between the lower broiling compartment and the upper baking compartment of the stove and plates 11 and 12 are secured to the side members of the lining 8 and 9 as shown most clearly in Fig. 3. The side member 8 is bent at right angles at its front end as shown at 13 and the enamel side piece 4 is bent at right angles as shown at 14. The flanges 13 and 14 are provided with apertures which align with each other and through which extends the projection 3 on the front cross piece 2. Extending across the front of the stove and slightly spaced from the front cross piece 2 is a cast iron front strip 15 which is secured to the front corner post in any suitable manner. The cast iron front strip 15 is shaped as shown most clearly in Fig. 4 and each end is apertured as shown in dotted lines in Fig.

4. These ends extend through the liner on each side and are engaged by the projections 3 on the enameled front piece, as seen in Figs. 2 and 3, so that the enameled front piece 1, the flange 14 of the side member 4, the flange 13 of the liner 8 and the front strip 15 are all secured at each front corner of the stove by means of the projection 3. The cast iron front strip 15 is provided with a pair of projections 17, the purpose of which will hereinafter appear. The front cross piece 2 is provided at each corner with an opening, one of which is shown in Fig. 4, and extending through each of the openings, is a stove bolt 16 which more rigidly fastens the cast iron front strip 15 to the enameled front cross piece 2. For protecting the front enamel strip against the direct heat of the burner I provide a heat insulating baffle plate 20 consisting of a layer of asbestos 21 enclosed in a suitable covering 22. The lower side of the covering 22 flares outwardly as shown at 23 in Fig. 1. The insulated baffle plate 20 is adapted to be supported on the projections 17 on the strip 15 and is rigidly secured in place by suitable nuts 17′. Due to the shape and size of the projections 17, it will be seen that the baffle plate 20 is supported so as to leave an air space 24 between the baffle plate 20 and the cast iron cross strip 15. It will also be seen that an air space 25 is provided between the cast iron cross strip 15 and the enamel front cross strip 2.

For dividing the heat chamber into two compartments I provide an enameled oven bottom or tray 26 which is supported at its front on the cast iron cross strip 15 and which may be supported at its side by suitable ribs or projections formed on the lining members 11 and 12. The tray 26 has a centrally disposed depression therein for receiving any fluid which may escape during the process of cooking.

The oven burner 27 consists of a cast iron burner head shaped in the form of a square having double rows of small downwardly projecting apertured bosses 28 and 29. The burner 27 is supported within the heat chamber by any suitable means and receives its supply of gas through an intake pipe 30 leading through an opening in the side of the stove. For effecting an even distribution of heat throughout both compartments of the range, I provide a cast iron baffle plate or auxiliary oven bottom 31. Secured to the back side of the plate 31 are a pair of projections or arms 32 and 33. Secured to the front of the plate 31 is an arm 34 which is shaped as shown most clearly in Fig. 1. The arms 32 and 33 project through openings in the back liner 7 and the arm 34 projects through an opening formed in the flared projection 23 on the heat insulating strip 20. The lower end of the arm 34 is shouldered as shown at 35 in Fig. 5.

It will now be clear that the cast iron cross strip 15 is spaced a slight distance from the enameled cross piece 2 and that the heat insulating baffle plate 20 is supported by the cast iron front strip 15 and spaced a slight distance therefrom; and that the heat insulating strip 20 supports the forward end of the cast iron baffle plate 31 and that the enameled front cross piece 2 is not exposed to the direct heat of the burner, there being the cast iron front strip, two air spaces 24 and 25 and the heat insulating strip 20 between the burner and the enameled front cross piece 2. It will now be clear that I have provided a gas range which accomplishes the objects of the invention as hereinbefore stated.

Various changes may be made in my construction without departing from the spirit of my invention and I wish my invention to be limited only in accordance with the scope of the appended claims.

Having thus described my invention, what I claim is:—

1. An oven construction for gas ranges comprising a baking compartment and a broiling compartment, a burner supported in said broiling compartment, a front strip extending across the front of said oven, a heat insulating member carried by said front strip in spaced relation thereto and disposed between said burner and said front strip.

2. An oven construction for gas ranges comprising a baking compartment and a broiling compartment, a burner supported in said broiling compartment, a front strip extending across the front of said oven, a heat insulating member carried by said front strip in spaced relation thereto and disposed between said burner and said front strip and a baffle plate extending across the top of said burner.

3. An oven construction for gas ranges comprising a baking compartment and a broiling compartment, a burner arranged in said broiling compartment adjacent the upper end thereof, a cross bar extending across the front of said oven, an enameled front piece secured to the outer side of said cross bar, a heat insulating strip secured to the inner side of said cross bar and spaced therefrom.

4. An oven construction for gas ranges comprising a baking compartment and a broiling compartment, a burner arranged in said broiling compartment, adjacent the upper end thereof, a cross strip extending across the front of said oven, an enameled front piece secured to the outer side of said cross strip, a heat insulating strip secured to the inner side of said cross strip and spaced therefrom and a baffle plate secured to said heat insulating strip and extending across said oven.

5. An oven construction for gas ranges comprising a baking compartment and a broiling compartment, a cross strip extending across the front of said oven, an enameled front piece secured to one side of said cross strip, a heat insulating member secured to the opposite side of said cross strip but spaced therefrom, a burner arranged within said oven substantially opposite said cross strip, a baffle plate extending across said broiling compartment above said burner.

6. An oven construction for gas ranges comprising a baking compartment and a broiling compartment, a cross strip extending across the front of said oven, an enameled front piece secured to one side of said cross strip, a heat insulating member secured to the opposite side of said cross strip but spaced therefrom, a burner arranged within said oven substantially opposite said cross strip, a baffle plate extending across said broiling compartment above said burner and a pan forming the bottom of said baking compartment.

7. An oven construction for gas ranges comprising a baking compartment and a broiling compartment, a cross strip extending across the front of said oven, an enameled front piece secured to one side of said cross strip, a heat insulating member secured to the opposite side of said cross strip, a burner arranged within said oven substantially opposite said cross strip, a baffle plate extending across said broiling compartment above said burner and a pan forming the bottom of said baking compartment.

8. An oven construction for gas ranges comprising a baking compartment and a broiling compartment, a cross strip extending across the front of said oven, an enameled front piece secured to one side of said cross strip, a heat insulating member secured to the opposite side of said cross strip but spaced therefrom, a burner arranged within said oven substantially opposite said cross strip, a baffle plate extending across said broiling compartment above said burner, a pan removably secured in said oven and having a depression therein for receiving any fluid which may escape during the process of cooking.

9. An oven construction for gas ranges comprising a heat compartment having top, bottom, side and back walls, a cross strip extending across the front of said heat compartment, a pan in said heat compartment dividing the same into an upper baking compartment and a lower broiling compartment, a burner arranged in said broiling compartment immediately below said pan, an enameled front piece secured to the outer face of said cross strip, a heat insulating strip secured to the inner face of said cross strip and interposed between said burner and cross strip.

10. An oven construction for gas ranges comprising a heat compartment having top, bottom, side and back walls, a cross strip extending across the front of said heat compartment, a pan in said heat compartment dividing the same into an upper baking compartment and a lower broiling compartment, a burner arranged in said broiling compartment immediately below said pan, an enameled front piece secured to the outer face of said cross strip, a heat insulating strip secured to the inner face of said cross strip and interposed between said burner and cross strip, and a baffle plate secured to said heat insulated strip and extending across the top of said burner.

11. An oven construction as set forth in claim 10 in which said pan is removably secured in said heat compartment and is provided with a depression adapted to catch fluid that might escape in the process of cooking.

12. An oven construction for gas ranges comprising a heat compartment having top, bottom, side and back walls, a pan arranged in said heat compartment and dividing the same into a baking compartment and a broiling compartment, a cross strip extending across the front of said heat compartment, an enameled front piece secured to the outer face of said cross strip, a heat insulating strip secured to the inner face of said cross strip, a burner arranged in said broiling compartment adjacent the top thereof and a heat insulating baffle plate extending across the top of said burner.

13. An oven construction as set forth in claim 12 in which said burner is rectangular in shape and is provided with a plurality of bosses on the underside thereof having ports therein for the emission of gas.

14. An oven construction as set forth in claim 10 in which said burner is rectangular in shape and provided with a double row of downwardly depending bosses, having ports therein for the emission of gas.

15. In a gas range, a heating compartment having a one piece enameled front, a cross strip secured to said enameled front but spaced therefrom, a heat insulating strip secured to said cross strip but spaced therefrom, a burner arranged within said heat compartment substantially opposite to said heat insulating strip whereby said enameled front is protected from the direct heat of said burner.

16. An oven construction comprising a baking compartment and a broiling compartment, a burner supported in said broiling compartment, a front piece extending across the front of said oven, a heat insulating member disposed between said burner and front piece whereby to protect said piece from the heat of the burner.

17. An oven construction for gas ranges comprising a baking compartment and a broiling compartment, a burner supported in said broiling compartment, an enameled front piece extending across the front of said oven, a heat insulating member disposed between said burner and front piece and a baffle extending across the top of said burner.

18. An oven construction of the character described comprising a baking compartment and a broiling compartment, a burner arranged in said broiling compartment adjacent the upper end thereof, a cross strip extending across the front of said oven, an enameled front piece secured to the outer side of said cross strip and a heat insulating strip disposed between said burner and cross strip and extending across the front of said oven.

19. In an oven construction for gas ranges, a heat compartment having top, bottom, side and back walls, an enameled cross piece extending across the front of said heat compartment, a burner arranged within said heat compartment, and a heat insulating member disposed between said enameled cross piece and burner, whereby to prevent crazing of said enameled cross piece.

20. A range of the character described having a heat compartment, a burner supported in said heat compartment, an enameled cross piece extending across the front of the range, a heat insulating member extending substantially across the front of the range and disposed between said enameled cross piece and burner, said heat insulating member being spaced from said enameled cross piece so as to provide an air space therebetween, whereby to protect the enameled cross piece from the direct heat of the burner.

21. A range of the character set forth comprising a heat compartment, a front frame having an enameled cross piece extending across the front of the range, a burner supported within said heat compartment, a front strip extending across the front of the range immediately opposite said cross piece, a heat insulating member extending across the front of the range immediately opposite said cross piece, said front strip and heat insulating member being disposed between said burner and enameled cross piece whereby to protect the same from the direct heat of the burner.

22. A range of the character set forth comprising a heat compartment, a burner supported in said heat compartment, said range having a front frame including an enameled cross piece extending across the front of the range, a front strip extending across the front of the range in spaced relation to said cross piece, a heat insulating member extending across the front of the range in spaced relation to said front strip, said front strip and heat insulating member being disposed between the burner and the enameled cross piece whereby to protect the same from the direct heat of the burner.

23. A range of the character set forth comprising a heat compartment and having a front frame member including an enameled cross piece extending across the front of the range, a burner arranged within the heat compartment, a front strip extending across the front of the range opposite said cross piece, a heat insulating member extending across the front of the range opposite said front strip and in spaced relation thereto, said front strip and heat insulating member being disposed between said burner and the enameled cross piece whereby to protect the same from the direct heat of the burner.

24. A range having a front frame and a heat compartment, a burner arranged within said heat compartment, a portion of said front frame extending across the front of said heat compartment, a shield member extending substantially across said heat compartment and disposed between said burner and that portion of the front frame which extends across said heat compartment whereby to protect the front frame from the direct heat of the burner.

25. A range having a front frame and a heat compartment, a burner arranged within said heat compartment, said front frame having a horizontally disposed portion extending across said heat compartment, a burner arranged within said heat compartment, one or more shield members extending substantially across said heat compartment and disposed between said burner and said horizontally disposed portion of said frame whereby to shield the front frame against the direct heat of the burner.

26. A range having a front frame and a heat compartment, said front frame having a horizontally disposed portion extending across said heat compartment, a burner arranged within said heat compartment, one or more shield members extending substantionally across said heat compartment and disposed between said burner and said horizontally disposed portion of said front frame so as to leave an air space therebetween whereby to prevent overheating of the horizontally disposed portion of said frame.

27. An oven construction comprising a baking compartment and a broiling compartment, a front strip extending across the front of said oven, a burner arranged within the broiling compartment substantially opposite said front strip, a baffle plate extending across said broiling compartment above said burner and a removable pan forming the bottom of said baking compartment.

28. An oven construction for gas ranges comprising a baking compartment and a broiling compartment, a front strip extending across the front of said oven, a burner arranged within said broiling compartment, a heat insulating member disposed between said burner and front strip, a baffle plate disposed over said burner, and a removable pan forming the bottom of said baking compartment.

29. An oven construction comprising a baking compartment and a broiling compartment, a burner arranged within the upper portion of said broiling compartment, a baffle plate disposed above said burner and a removable pan forming the bottom of said baking compartment, and means for supporting said baffle plate independent of the bottom of said baking compartment.

30. In an oven construction for gas ranges, the combination of a heat chamber divided into a baking compartment and a broiling compartment, a burner arranged within the upper portion of said broiling compartment, said burner being substantially rectangular in shape and having a plurality of rows of downwardly projecting bosses on the under side thereof, each boss having a port therein for the emission of gas, and a baffle plate disposed between the bottom of said baking compartment and burner and supported independently of the bottom of said baking compartment.

31. In an oven construction for gas ranges, the combination of a heat chamber, a pan removably secured within said heat chamber and dividing the same into a baking compartment and a broiling compartment, said removable pan having a depression therein adapted to receive fluid which may escape during the cooking process, a burner arranged within the upper portion of said broiling compartment and a heat insulating baffle disposed between said pan and burner and supported independently of said removable pan.

In testimony whereof I hereunto affix my signature.

THOMAS E. TAYLOR.